(Model.)
J. O. WADDELL.
FAUCET.
No. 253,136. Patented Jan. 31, 1882.
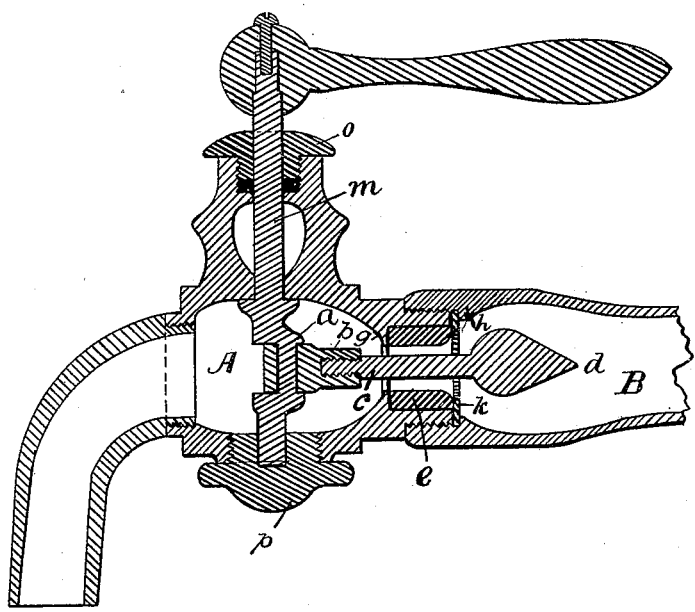
Witnesses:
Charles H. Pell
Chas. Herr
Inventor:
James O. Waddell,
by O. Drake, Atty.

UNITED STATES PATENT OFFICE.

JAMES O. WADDELL, OF ELIZABETH, NEW JERSEY.

FAUCET.

SPECIFICATION forming part of Letters Patent No. 253,136, dated January 31, 1882.

Application filed May 11, 1881. (Model.)

*To all whom it may concern:*

Be it known that I, JAMES O. WADDELL, a resident of Elizabeth, in the county of Union and State of New Jersey, have invented certain new and useful Improvements in Faucets; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

This invention relates more especially to improvements in a device secured to me by Letters Patent No. 200,416, bearing date February 19, 1878, the object being to reduce the cost of manufacture and render the same more effective. Further objects are to allow the faucet to be more readily repaired when worn from use, and to prevent certain objectionable vibrations of the pipe when the water is suddenly turned off.

The invention consists in the combinations, conformations, and arrangements of parts, all of which will be hereinafter fully described, illustrated, and finally definitely claimed.

The accompanying drawing is a sectional view of my device, illustrating the internal arrangements of the parts and their relations to one another.

In carrying out my invention I construct the body of the faucet with an enlarged chamber, A, therein, adapted to receive an eccentric, $a$, and collar $b$, and allow the same to work. Said collar $b$ has secured therein a connecting rod or stem, $c$, said eccentric, collar, and connecting-rod being arranged in regard to one another substantially as before. On the free end of the connecting rod or stem a valve-head is constructed, formed entirely of metal. Said valve-head $d$ may either be formed integral with the stem $c$ or the two may be screwed together, the former manner of construction being preferable, as it may be done at a smaller expense. Said head has the shape of a cone, the apex of which points against the flow of the water, and the base thereof being rounded to engage with a valve-seat hereinafter described.

In constructing the valve-seat I form in the body of the faucet a socket or seat for an elastic washer, $e$, said socket being formed by arranging the flange $g$ in such a manner as to engage with the edge of the said elastic washer.

Within the thimble B is formed a similar flange, $h$, which, when the thimble and faucet-body are in their relative positions, co-operates with said flange $g$ in holding said washer $e$ in operative connection with the other parts. The said elastic washer may be formed of rubber or other suitable material adapted to form a water-tight joint with the head, and may have a slightly-flanged portion or edge adapted to pass into the joint between the thimble and body, by which it is more securely held. The valve-seat washer $e$ is tubular in shape, and is equal in depth, approximately, to the diameter thereof.

In addition to the flange $h$ within the thimble, or in substitution therefor, I may use a metallic washer, $k$.

The formation and peculiar arrangement of the valve head and seat effectually prevent a peculiar and disagreeable vibration of the pipes when the water is suddenly turned off, and also allow of great ease and readiness in repair, as, when the rubber washer is worn out, (which, however, will not be soon after the parts are in operation, there being no friction upon said washer,) a new one may be substituted by simply disconnecting the thimble and valve-head from the body, &c., of the faucet, all of which will be evident. This arrangement of the parts also reduces the cost of construction by simplifying and reducing the number of parts.

I have materially improved the faucet in the method adopted of adjusting the crank-shaft in the faucet. Heretofore the upper bearings for said crank-shaft or eccentric $m$ were formed within an extension-cap screwed into an aperture in the upper portion of the faucet body, and it is very evident that said cap was liable to loosen when the shaft was turned in manipulating the faucet, and thus allow a leakage. In my invention I do away with the said extension-cap and form the bearings for said shaft integral with the faucet-body. A shoulder on said shaft engages with said bearing, forming an arrangement which is simple, effective, and withal durable. The manner of arranging the parts, however, necessitates an opening upon the under side of the faucet of sufficient size to allow the eccentric or crank to enter. I therefore form the aperture as shown, and provide it with a screw-thread, and thus adapt it to receive a bottom screw, $p$. Said bottom screw has a bearing therein for the lower extremity of the crank-shaft, placed at a point directly in a line with said shaft, as will be evident. The eccentric-shaft is passed through the under aperture or opening, up through the upper bearings until the shaft-shoulder strikes upon said bearings, the bottom bearing-screw is then screwed into position, and the shaft held securely. The friction of said shaft in said bearing will not be sufficient to loosen said screw, as in the case of the extension-cap before mentioned, there not being the friction of the packing in the stuffing-box which before had a tendency to loosen the joint, as will be understood. In the present case the stuffing-box is within the faucet-body, as indicated in the drawing.

Having thus described my invention, what I claim, and wish to secure by Letters Patent, is—

1. The combination, in a faucet, with the eccentric $a$, of a collar, $b$, and a stem and valve-head formed integral with one another, said head having a regular outline, the shape being that of a round-based cone, said parts being arranged and operating substantially as and for the purposes set forth and shown.

2. In a faucet having a metallic valve-head operated by an eccentric, the combination, with the body of said faucet having a flange, and a thimble having a co-operating flange, $h$, of a tubular rubber (or composition of rubber) valve-seat the depth of which approximates the diameter thereof, substantially as and for the purposes set forth and shown.

3. The combination, with the faucet-body A, having an upper bearing formed integral therewith, of a shaft having a shoulder formed thereon engaging with said bearing, and a bottom screw, forming a lower bearing for said shaft, secured in an opening of sufficient size and adapted to allow the upward passage of said shaft, all substantially as and for the purpose herein set forth and shown.

In testimony that I claim the foregoing I have hereunto set my hand this 2d day of May, 1881.

JAMES O. WADDELL.

Witnesses:
 OLIVER DRAKE,
 CHARLES H. PELL.